March 28, 1961 L. H. WHEELER 2,976,993
LUMBER SORTER
Original Filed Aug. 26, 1954 5 Sheets-Sheet 1

INVENTOR.
LIONEL H. WHEELER
BY Murray Robinson
ATTORNEY

March 28, 1961 L. H. WHEELER 2,976,993
LUMBER SORTER

Original Filed Aug. 26, 1954 5 Sheets-Sheet 3

INVENTOR.
LIONEL H. WHEELER
BY Murray Robinson
ATTORNEY

March 28, 1961 L. H. WHEELER 2,976,993
LUMBER SORTER

Original Filed Aug. 26, 1954 5 Sheets-Sheet 4

INVENTOR.
LIONEL H. WHEELER
BY Murray Robinson
ATTORNEY

March 28, 1961    L. H. WHEELER    2,976,993
LUMBER SORTER

Original Filed Aug. 26, 1954    5 Sheets-Sheet 5

*INVENTOR.*
LIONEL H. WHEELER
BY Murray Robinson
    *ATTORNEY*

United States Patent Office 2,976,993
Patented Mar. 28, 1961

2,976,993
LUMBER SORTER

Lionel H. Wheeler, Houston, Tex., assignor to H. E. Bovay, Jr., Consulting Engineers, Houston, Tex., a partnership Continuation of application Ser. No. 452,344, Aug. 26, 1954. This application Apr. 15, 1960, Ser. No. 22,448

7 Claims. (Cl. 209—88)

This invention pertains to sorting devices and more particularly to apparatus for sorting lumber according to thickness. This application is a continuation of Serial No. 452,344, filed August 26, 1954, now abandoned.

It is an object of the invention to provide such an apparatus which will function at high speed.

It is another object of the invention to provide such an apparatus that will operate perfectly regardless of warpage of the lumber.

It is a further object of the invention to provide such an apparatus that will occupy only a small space.

It is also an object of the invention to provide such an apparatus that will be economical in operation, simple and inexpensive to maintain, inexpensive in initial cost, and durable and of long life.

Other objects and advantages of the invention will become apparent from the following description of a preferred embodiment thereof, reference being made to the accompanying drawings in which.

Figure 1:
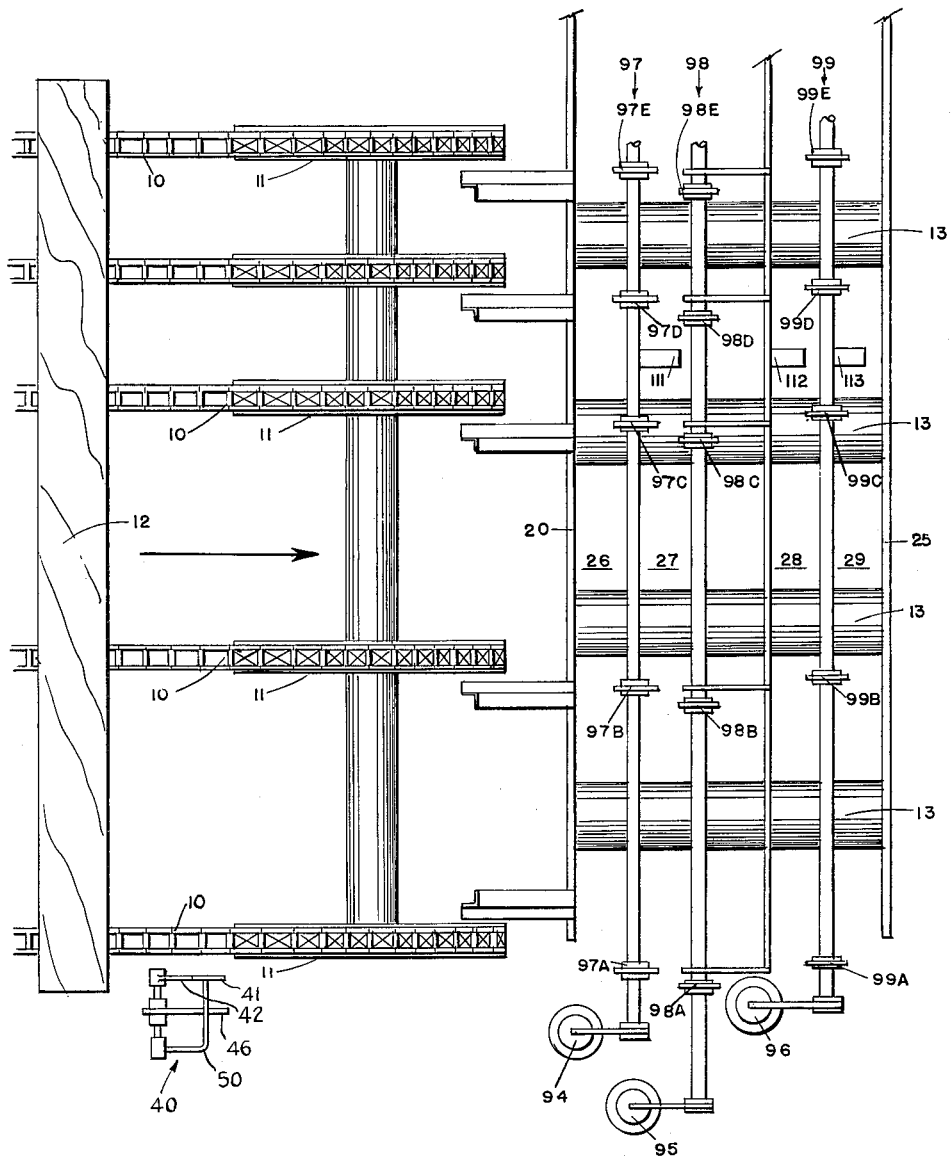
Figure 1 is a plan view of an apparatus embodying the invention.
Figure 2:
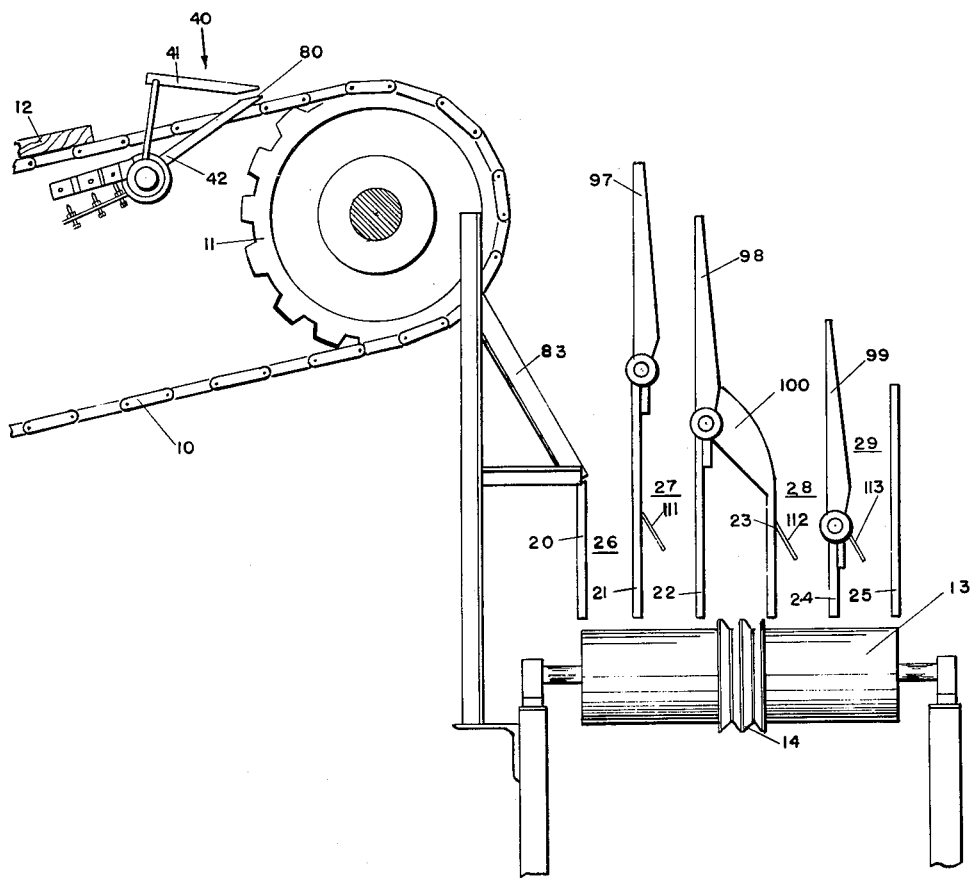
Figure 2 is a side view of the apparatus shown in Figure 1.

Referring now to Figures 1 and 2 there is shown a first conveyor comprising a plurality of chains 10 driven by sprockets 11 and carrying a piece of lumber or board 12 in the direction of the arrow. The board 12 is disposed with its length transverse to the direction of its travel. The board is lying on its side. The board is carried by the conveyor to the end thereof where it falls onto a second conveyor comprising a plurality of rolls 13, some of which are idlers and some of which are live rolls driven by V-belts, not shown, engaging V-groove pulleys 14 connected to the live rolls.

The second conveyor is divided by longitudinal partitions or walls 20-25 into four sections or slots 26-29. The distance between the walls of each slot is sufficient only to receive a board resting on its edge. For this reason, this type of partitioned conveyor is known as an edge sorter, boards being put into different slots according to variations in some characteristic thereof such as quality, length, width, thickness or combinations thereof and carried by the different sections of the conveyor to different points of discharge and accumulation.

Usually an edge sorter is fed manually, the lumber from a previous conveyor being delivered to a table from which an operator selects boards to go into the different slots. There may be as many different slots as there are classes of boards to be separated or as shown in U.S. Patent 2,636,601 granted April 28, 1953 on the application of H. E. Bovay, Jr., Lionel H. Wheeler, and Charles A. Lawler, there may be provided means along each slot for further sorting, e.g. according to length, whereby the total number of slots is reduced.

According to the present invention means is provided at the juncture of the transverse conveyor and the edge sorter to automatically separate the different classes or sizes of lumber and feed them to different slots of the edge sorter. As shown in the preferred embodiment, this sorting is according to thickness. The means for this purpose includes a thickness gage 40 disposed near the end of the transverse conveyor. The gage 40 comprises a pair of calipers having arms 41, 42 between which the board 12 must pass.

Figure 3:
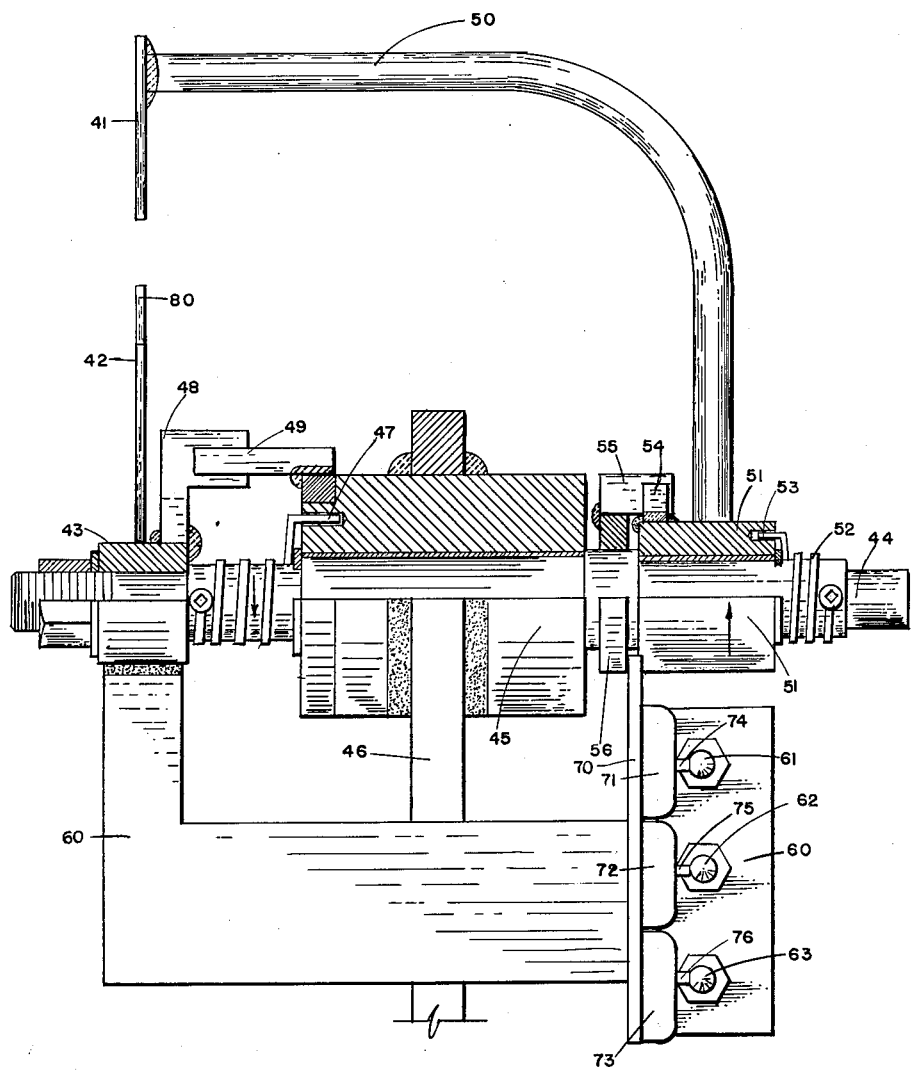
Figure 3 is an end view showing the details of the thickness gaging mechanism.
Figure 4:
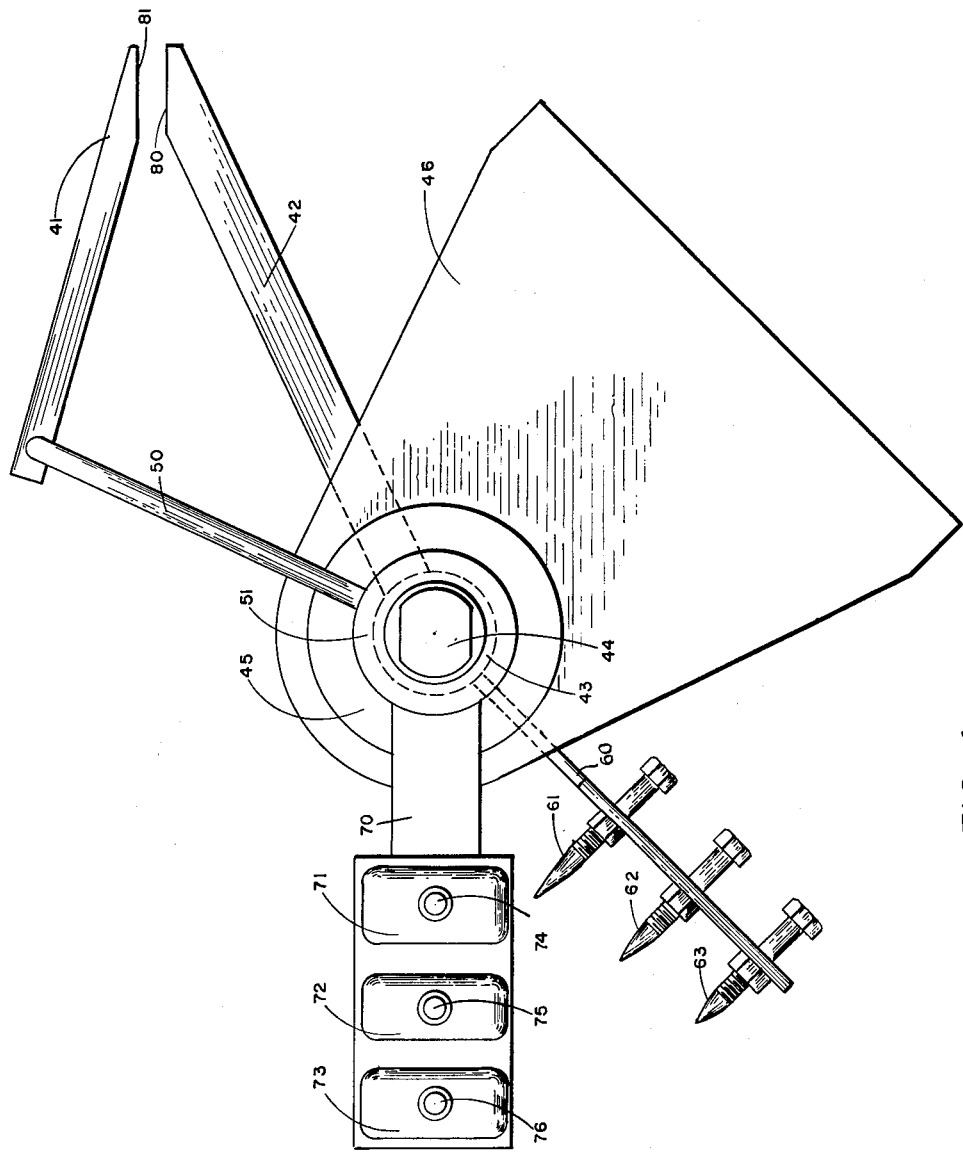
Figure 4 is a side view of the gaging mechanism shown in Figure 3.

Referring now to Figures 3 and 4, arm 42 is carried by a hub 43 fixed to shaft 44 which is rotatably mounted in bearing 45 carried by support 46 secured to the conveyor frame. A helical torsion spring 47 is secured at one end to shaft 44 and its other end 47 is secured to bearing 45. Spring 47 tends to rotate shaft 44 in the direction of the arrow until stop 48 fixed to hub 43 abuts against stop 49 fixed to bearing 45.

Caliper arm 41 is secured by rod 50 to hub 51 rotatably mounted on shaft 44. A helical torsion spring 52 is secured at one end to shaft 44 and at its other end 53 to hub 51. Spring 52 tends to rotate hub 51 relative to shaft 44 in the direction of the arrow until stop 54 fixed to hub 51 abuts against stop 55 fixed to collar 56 secured to shaft 44.

An arm 60 secured to hub 43 so as to move with caliper arm 42 carries three switch actuator pins 61–63. The pins are threaded and screwed through holes in arm 60 and secured in position by nuts, so that by loosening the nuts the positions of the ends of the pins can be adjusted.

An arm 70 is fixed to hub 51 so as to move with caliper arm 41. Three switches 71–73 are fixed to arm 70 with their actuator buttons 74–76 disposed in the path of travel of pins 61–63. When the large diameter portions of pins 61–63 are in engagement with buttons 74–76, switches 71–73 are closed; when the pins are out of contact with the buttons the switches are open. The tapered ends of the pins 61–63 allow the pins initially to pass over the buttons without contacting them and then further movement of the pins brings the sides of the pins into engagement with the buttons to depress them increasing amounts until the large diameter parts of the pins bear on the buttons. The tapered ends of the pins thus function as cams to depress the pins. Further travel of the pins does not push the buttons down any farther, so that a certain amount of over travel of the pins is permitted without damage to the switches.

Referring again to Figure 1 as well as Figures 3 and 4, the upper end 80 of caliper arm 42 is disposed normally at a level high enough above conveyor chains 10 so as to be depressed by all lumber passing through the caliper arms, even if the lumber is warped or for other reason is elevated at the end going through the calipers. If, because of warpage or other reason, a board is turned up on its end instead of lying flat, caliper arm 42 will be depressed less than it would otherwise normally be by a board of the same thickness lying flat on the conveyor chains. However, in such case arm 41 would be elevated more than normal by an equal amount so that the separation of arms 41 and 42 would be the same as normal despite the abnormal elevation of the end of the board.

On the other hand it is to be noted that as arm 42 is depressed shaft 44 is turned and collar 56, stop 55 and the end of spring 52 fixed to shaft 44 are also turned. Therefore as arm 41 is depressed arm 42 tends to move down with it. This takes care of the case of a board turned down on its end because of warpage or other reason. If the board is turned down so far as to be completely below the normal position of end 81 of arm 41, the end 81 will nevertheless contact the upper surface of the board because depression of arm 42 tends to depress arm 41 with it and will bring arm 41 down until end 81 contacts the board. Therefore despite a board being turned down on its end the caliper arms 41 and 42 will accurately gage its thickness.

Depending on the thickness of the board passing through the calipers of the thickness gage 40, the arms 41 and 42 will be separated a greater or lesser amount and arms 70 and 60 will be brought closer together to varying extents. Minimum thickness boards, that is, boards of less than a predetermined thickness will not bring arms 70 and 60 close enough together to actuate any of switches 71–73 and the boards will drop off the chain conveyor onto fixed guide 83 and into slot 26 (see also Figure 2). Boards of greater thickness will bring arms 70 and 60 close enough together to close one or more of switches 71–73.

Figure 5:
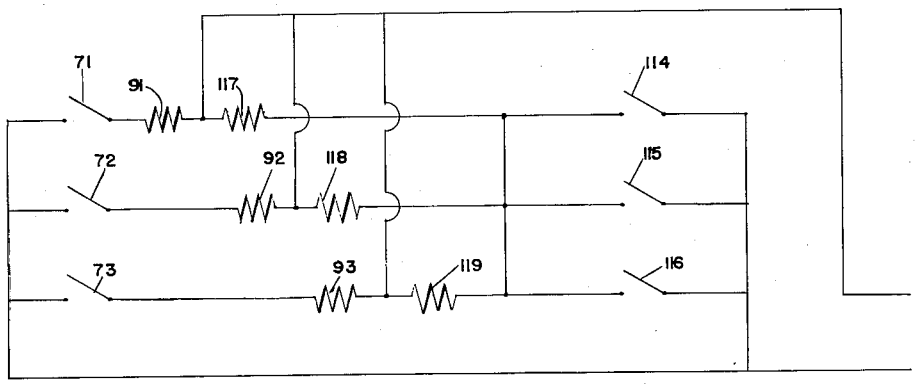
Figure 5 is a wiring diagram showing the connection of the gaging mechanism to the solenoids of the sorting apparatus.

Referring to Figure 5, closure of switches 71–73 respectively energizes solenoids 91–93. Each solenoid controls an air valve which in turn control the admission of air to cylinders 94, 95, 96 (Figure 1) whose pistons actuate deflectors 97–99 each composed of a group of bars 97A–E, 98A–E, 99A–E. Closure of switches 71–73 respectively causes the closure of deflectors 97–99 over slots 26–28 respectively. If a board is only thick enough to close switch 71, gate 97 is closed to deflect the board past slot 26 into slot 27. If a board is thick enough to close both switches 71 and 72, both deflectors 97 and 98 are closed and lumber is deflected past slots 26 and 27 onto fixed guide 100 over the drive pulleys 14 into slot 28. If a board is thick enough to close switches 71–73 deflectors 97–99 will be closed over slots 26–28 and boards will pass into slot 29.

Referring to Figure 2, when a board drops into any one of slots 27–29, it strikes the corresponding one of the switch actuators 111–113 which actuate switches 114–116 respectively. When the board strikes the switch actuator the switch controlled thereby is closed. As shown in Figure 5, switches 114–116 are connected in parallel and this group of switches is connected in series with a group of three parallel connected solenoids 117–119. Each solenoid 117–119 acts on one of the air valves controlled by solenoids 91–93 to control the admission of air to cylinders 94–96. Closure of any one of switches 114–116 energizes all three solenoids 117–119. Any air valve last previously acted on by one of solenoids 91–93 will be moved to a position to admit air to the corresponding one of cylinders 94–96 to move its piston to reopen the deflector controlled thereby. In this manner the deflectors are returned to their initial positions ready for the next board.

Figure 7:
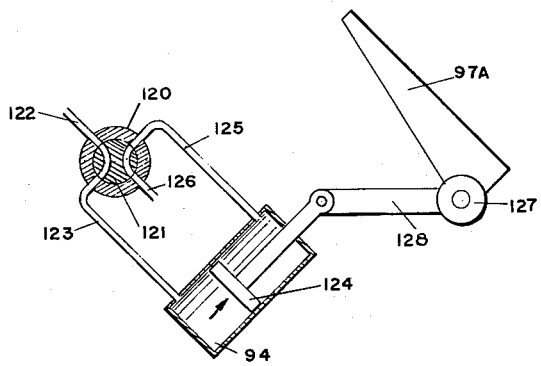
Figure 7 is a detail showing the connection of a valve to one of the hydraulic cylinders of the sorting apparatus.
Figure 6:
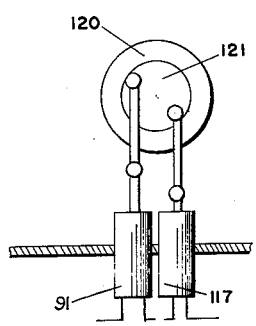
Figure 6 is a detail showing the connection of the solenoids to the valves of the sorting apparatus.

The three air valves controlled by the three pairs of solenoids 91–117, 92–118, 93–119 are all the same. The three cylinders 94–96 and their connections to the three deflectors 97–99 are all the same. For example in Figures 6 and 7 there is shown an air valve 120 controlled by solenoids 91 and 117 pivotally connected to the valve core 121. As shown in Figure 7 the valve core is in position to admit air under pressure from pipe 122 to pipe 123 leading to the portion of cylinder 94 at one side of piston 124 and connect the portion of cylinder 94 at the other side of the piston through pipe 125 to atmospheric vent pipe 126. This moves piston 124 in the direction of the arrow to turn lever 128 fixed to shaft 127 and move bars 97A–E of deflector 97 into position to close slot 26. This is the position of the parts when solenoid 91 was the last solenoid energized. Energization of solenoid 117 rotates core 121 counterclockwise ninety degrees to connect high pressure air line 122 to pipe 125 and atmospheric vent pipe 126 to pipe 123 causing piston 124 to move in the direction opposite to the arrow and restore deflector 97 to its open position. It is to be noted that air continues to act on piston 124 after it has moved to either extreme position, thereby holding the deflector in place.

The connections of pipes 122 and 126 to the valve 120 can be reversed and the connections to the other air valves similarly reversed. Such an arrangement would place all the deflectors normally in closed position. At the same time switches 71 and 72 would be interchanged. Minimum thickness lumber would then pass over all the deflectors into slot 29, thicker lumber would cause switch 71 to open deflector 99 and cause the boards to drop into slot 28. Still thicker lumber would close switch 72 and open deflector 98 to drop the lumber into slot 27. Maximum thickness lumber would close switch 73 and cause the lumber to drop into slot 26. Actuation of any one of levers 111–113 would reclose all the open deflectors as before.

It will be noted that in both the described modes of operation of the apparatus, the deflectors serve not only as gates to keep lumber out of the slots when the deflectors are in lowered position but as guides to guide lumber into the slots when the deflectors are in open position.

While a preferred embodiment of the invention and one variation have been shown and described, many other modifications can be made by one skilled in the art without departing from the spirit of the invention and it is desired to protect by Letters Patent all forms of the invention falling within the scope of the following claims.

I claim:

1. In combination, conveyor means for continuously transporting boards with the boards disposed on their sides with their lengths transverse to the direction of travel, an edge sorter having a plurality of slots lying transversely across the end of said conveyor means, deflector means for guiding the boards into any desired one of the slots, and means controlled by the moving boards on said conveyor means according to a predetermined characteristic thereof to move the position of said deflector means temporarily to cause boards from said conveyor means to be deposited in the desired slots, said means controlled by the moving boards including upper and lower caliper arms disposed adjacent the end of said conveyor means in position to be mutually spread apart from their normal positions in a direction transverse to the plane of said conveyor by boards passing therebetween as they are carried along by the conveyor, a portion of the lower caliper arm in its normal position lying above the plane of said conveyor and being depressible by the boards to a lower position, the upper caliper arm in its normal position lying above and closely adjacent the lower caliper arm, means urging said arms to their normal position, and means urging the upper caliper arm toward the lower caliper arm tending to maintain the same position of the upper caliper arm relative to the lower caliper arm at all times, whereby said caliper arms will be separated by boards in proportion to their thickness even though not lying flat on the conveyor.

2. In combination, conveyor means for continuously transporting boards with the boards disposed on their sides with their lengths transverse to the direction of travel, an edge sorter having a plurality of slots lying transversely across the end of said conveyor means, deflector means for guiding the boards into any desired one of the slots, and means controlled by the moving boards on said conveyor means according to a predetermined characteristic thereof to move the position of said deflector means temporarily to cause boards from said conveyor means to be deposited in the desired slots, said deflector means comprising a deflector for each of said slots except the slot farthest from said conveyor means, at the side of each said slot farthest from said conveyor means, and means independently mounting each of said deflectors for independent movement between a position guiding boards into its slot and a position closing the top of its slot to the entrance of boards and guiding boards to the next adjacent slot, the top of each deflector when in closed position forming an incline, and the deflectors being disposed at successively lower levels progressing away from the end of said conveyor means.

3. The combination of claim 2 wherein said deflectors are all normally open to guide boards to the slot nearest said conveyor means, and the means controlled by the moving boards causes the closure of all deflectors from said nearest slot up to another slot when it is desired to place a board in said other slot.

4. The combination of claim 2 wherein said deflector means are all normally closed to guide boards to the slot farthest from said conveyor means and the means controlled by the moving boards causes the opening of the deflector of one of the other slots when it is desired to place a board in said one of the other slots.

5. Sorting apparatus comprising continuous conveying means for continuously transporting boards with the boards on their sides and their lengths transverse to the direction of travel, upper and lower caliper arms disposed adjacent the end of said conveyor means, a portion of the lower caliper arm in its normal position lying above the plane of said conveyor and being movable by the said boards to a lower position, the upper caliper arm in its normal position lying above and closely adjacent the lower caliper arm, means resiliently urging said arms to their normal position, and means resiliently urging the upper caliper arm toward the lower caliper arm tending to maintain the same position of the upper caliper arm relative to the lower caliper arm at all times, whereby said caliper arms will be separated by boards in proportion to their thickness even though not lying flat on the conveyor, an edge sorter to which said boards are delivered by said continuous conveying means, said edge sorter comprising a plurality of slots transverse to said continuous conveying means for receiving lumber therefrom, deflector means intermediate each pair of adjacent slots for guiding the boards from said continuous conveying means into any desired one of said slots, means mounting each of said deflectors for independent movement between a closed position closing the top of an adjacent slot to the entrance of boards and guiding boards to the next adjacent slot and an open position guiding boards into the first adjacent slot, the top of each deflector when in closed position forming an incline, the deflectors being disposed at successively lower levels progressing away from the end of said conveyor means, said deflectors all being normally open to guide boards to the slot nearest said conveyor means, deflector closing means attached to each deflector, a plurality of switches, equal to the number of deflectors, affixed to one of the caliper arms, a plurality of switch actuating pins affixed to the other caliper arm so positioned as to sequentially actuate said switches as the caliper arms are moved with respect to each other, means operatively connecting each of said switches to one of the deflector closing means to sequentially close said deflectors as said switches are actuated, and means in each of said slots operable to move all of said deflectors to an open position when a board drops into any of said slots.

6. Sorting apparatus comprising continuous conveying means for transporting boards in a direction transverse to their lengths, actuating means adjacent said conveying means, said actuating means comprising a pair of arms adapted to be moved apart by a board passing therebetween to form a gap therebetween having a width equal to the thickness of said board, means resiliently connecting said arms to each other and urging them toward each other, said arms being movable together to a variety of positions upon the passage of a board therebetween while maintaining the width of the said gap, and sorting means adapted to sort said boards according to their respective thickness in response to actuation by said actuating means.

7. Sorting apparatus for sorting boards according to their thicknesses which comprises continuous conveying means for transporting boards in a direction transverse to their lengths, upper and lower caliper arms positioned adjacent the conveying means, a portion of the lower caliper arm in its normal position lying above the plane of said conveying means, said upper caliper arm in its normal position lying above and closely adjacent the lower caliper arm, means adapted to resiliently urge said lower caliper arm upwardly upon upward movement of the upper caliper arm, means adapted to resiliently urge said upper caliper arm downwardly upon downward movement of said lower caliper arm, whereby said arms are adapted to be moved apart by a board passing therebetween to form a gap having a width equal to the thickness of said board and to be movable together to a variety of positions upon the passage of a board therebetween while maintaining the width of the said gap, sorting means adapted to sort the boards according to their respective thicknesses as determined by the caliper arms, and means operably connected to said caliper arms adapted to actuate said sorting means.

References Cited in the file of this patent

UNITED STATES PATENTS 968,053    Heldmann             Aug. 23, 1916

FOREIGN PATENTS 222,908    Switzerland            Nov. 2, 1942